(12) United States Patent
Donaldson et al.

(10) Patent No.: US 12,139,251 B2
(45) Date of Patent: *Nov. 12, 2024

(54) DOWNLOAD REDUCING WINGLETS FOR AIRCRAFT HAVING A ROTOR PRODUCING DOWNWASH AND METHOD OF OPERATING THE SAME

(71) Applicant: Textron Innovations Inc., Providence, RI (US)

(72) Inventors: Kent E. Donaldson, Fort Worth, TX (US); Kyle Smolarek, Fort Worth, TX (US); Lynn Francis Eschete, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/883,148

(22) Filed: Aug. 8, 2022

(65) Prior Publication Data
US 2022/0380025 A1 Dec. 1, 2022

Related U.S. Application Data

(63) Continuation of application No. 16/797,342, filed on Feb. 21, 2020, now Pat. No. 11,440,644.

(51) Int. Cl.
*B64C 23/06* (2006.01)
*B64C 21/10* (2006.01)
*B64C 27/32* (2006.01)

(52) U.S. Cl.
CPC ............ *B64C 23/069* (2017.05); *B64C 21/10* (2013.01); *B64C 27/32* (2013.01)

(58) Field of Classification Search
CPC ....... B64C 21/10; B64C 23/06; B64C 23/065; B64C 23/069; B64C 27/32
USPC ........................................................ 244/199.4
See application file for complete search history.

(56) References Cited

U.S. PATENT DOCUMENTS

| | | | |
|---|---|---|---|
| 1,773,280 A | 8/1930 | Scott | |
| 3,149,800 A | 9/1964 | Sintes | |
| 3,369,775 A | 2/1968 | Rethorst | |
| 4,354,648 A | 10/1982 | Schenk et al. | |
| 4,928,907 A | 5/1990 | Zuck | |
| 4,975,022 A * | 12/1990 | Perry | B64C 27/463 244/17.11 |
| 5,158,251 A | 10/1992 | Taylor | |
| 5,267,626 A | 12/1993 | Tanfield, Jr. | |
| 5,634,613 A | 6/1997 | McCarthy | |
| 5,992,793 A * | 11/1999 | Perry | B64C 27/463 244/17.11 |
| 6,168,383 B1 * | 1/2001 | Shimizu | B64C 27/463 416/223 R |
| 6,607,168 B1 | 8/2003 | Cordier et al. | |
| 7,137,589 B2 | 11/2006 | Arata | |
| 7,988,100 B2 | 8/2011 | Mann | |

(Continued)

*Primary Examiner* — Brady W Frazier
(74) *Attorney, Agent, or Firm* — Bradley Arant Boult Cummings LLP

(57) ABSTRACT

An exemplary aircraft includes a wing positioned below a vertical rotor, the wing extending to an outboard end, and an anhedral winglet extending from the outboard end through an angular transition to a tip, the anhedral winglet having an external surface exposed to the rotor downwash and the external surface is contoured to generate local wing lift in response to the rotor downwash.

20 Claims, 3 Drawing Sheets

(56) References Cited

U.S. PATENT DOCUMENTS

| | | |
|---|---|---|
| 8,376,266 B2 | 2/2013 | Gemmati et al. |
| 8,820,673 B2 | 9/2014 | Cacciaguerra |
| 9,266,607 B2 | 2/2016 | Fink et al. |
| 9,302,761 B2 | 4/2016 | Isotani et al. |
| 9,327,828 B2 * | 5/2016 | Gionta .................... B64C 5/02 |
| 9,714,080 B2 | 7/2017 | Bradshaw et al. |
| 9,738,379 B2 | 8/2017 | Cacciaguera |
| 9,868,516 B2 | 1/2018 | Rosenberger et al. |
| 10,005,550 B2 | 6/2018 | Toulmay |
| 10,071,798 B2 | 9/2018 | Zhong et al. |
| 10,266,252 B2 | 4/2019 | Anderson et al. |
| 10,421,533 B2 | 9/2019 | Domel et al. |
| 10,625,847 B2 | 4/2020 | Dhandhania |
| 10,988,235 B2 | 4/2021 | Fukari et al. |
| 2002/0011539 A1 | 1/2002 | Carter |
| 2005/0151001 A1 | 7/2005 | Loper |
| 2006/0249630 A1 | 11/2006 | McCarthy |
| 2007/0252031 A1 | 11/2007 | Hackett et al. |
| 2008/0217485 A1 | 9/2008 | Ikeda |
| 2008/0237392 A1 | 10/2008 | Piasecki et al. |
| 2009/0065650 A1 | 3/2009 | McKeon et al. |
| 2010/0065677 A1 | 3/2010 | Ferrier |
| 2014/0061366 A1 | 3/2014 | Fink et al. |
| 2016/0272302 A1 | 9/2016 | Rosenberger et al. |
| 2017/0291699 A1 | 10/2017 | Hunter et al. |
| 2018/0050790 A1 | 2/2018 | Whitehouse et al. |
| 2018/0281936 A1 | 10/2018 | Robertson et al. |
| 2018/0304997 A1 | 10/2018 | Dhandhania |
| 2020/0023946 A1 | 1/2020 | Anderson et al. |
| 2020/0055595 A1 | 2/2020 | Bailie |
| 2021/0261240 A1 | 8/2021 | Donaldson et al. |
| 2021/0284328 A1 | 9/2021 | Donaldson et al. |

* cited by examiner

DOWNLOAD REDUCING WINGLETS FOR AIRCRAFT HAVING A ROTOR PRODUCING DOWNWASH AND METHOD OF OPERATING THE SAME

CROSS-REFERENCE TO RELATED APPLICATION

This application is a continuation of U.S. application Ser. No. 16/797,342, filed on Feb. 21, 2020. The contents of U.S. application Ser. No. 16/797,342 are incorporated by reference in their entirety herein for all purposes.

TECHNICAL FIELD

This disclosure relates in general to the field of aircraft, and more particularly, to a vertical takeoff and landing aircraft with wings and download reducing winglets.

BACKGROUND

This section provides background information to facilitate a better understanding of the various aspects of the disclosure. It should be understood that the statements in this section of this document are to be read in this light, and not as admissions of prior art.

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas.

Tiltrotor aircraft include proprotors that can change their plane of rotation based on the operation being performed. Tiltrotor aircraft generate lift and propulsion using proprotors that are typically coupled to nacelles mounted near the ends of a fixed wing. The proprotors rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

SUMMARY

An exemplary aircraft includes a wing positioned below a vertical rotor, the wing extending to an outboard end, and an anhedral winglet extending from the outboard end through an angular transition to a tip, the anhedral winglet having an external surface exposed to the rotor downwash and the external surface contoured to generate local wing lift in response to the rotor downwash.

An exemplary method includes operating an aircraft in a hover, the aircraft having a vertical rotor producing a rotor downwash directed vertically downward onto a wing extending to an outboard end, and an anhedral winglet extending from the outboard end through an angular transition to a tip, the anhedral winglet having an external surface exposed to the rotor downwash. In an embodiment the anhedral winglet generates local lift in response to the rotor downwash. A turbulence feature may be located on the external surface of the anhedral winglet to trigger turbulence in the rotor downwash on the external surface of the winglet.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
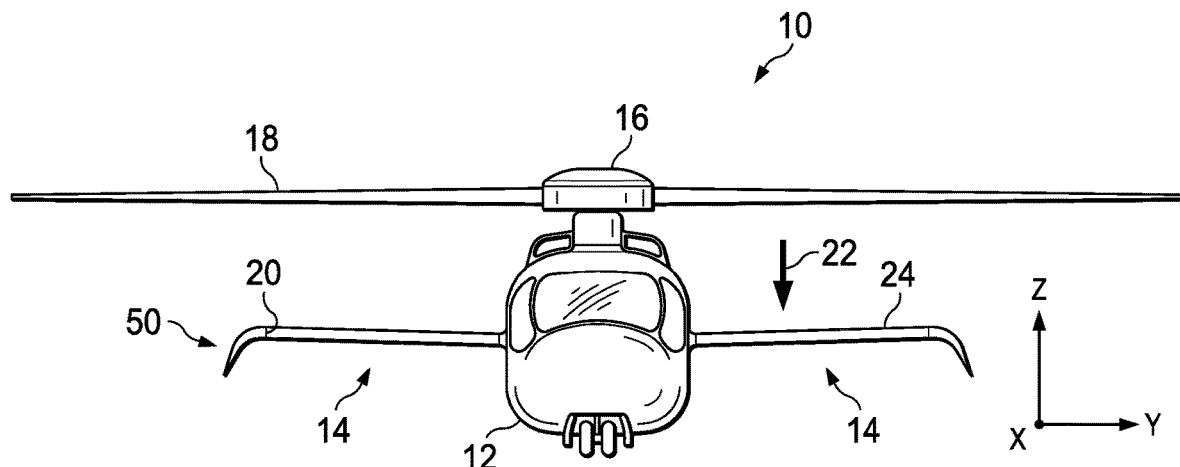
FIG. 1 illustrates an exemplary aircraft incorporating wings with download reducing winglets.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 depicts three mutually orthogonal directions X, Y, and Z forming a three-dimensional frame of reference XYZ. Longitudinal axis X corresponds to the roll axis that extends through the center of the aircraft 10 in the fore and aft directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates an exemplary aircraft 10, shown as a helicopter, incorporating download reducing winglets 50. Aircraft 10 includes a fuselage 12, a left wing 14, right wing 14, and a vertical rotor 16 including rotor blades 18. Operating vertical rotor 16 produces a rotor downwash 22. The pitch of vertical rotor 16 may be changed to direct rotor downwash 22 to operate the aircraft in hover mode or a cruise mode (forward, reverse, and side flight). Wings 14 are located below vertical rotor 16, at least in the hover mode, and the wings extend outward from fuselage 12 in the transverse direction Y to outboard ends 20. Anhedral winglets 50 are located at outboard ends 20.

Aircraft 10 is illustrated as a helicopter for purposes of description, however, the aircraft is not limited to helicopters. Aircraft 10 includes, without limitation, vertical takeoff and landing aircraft, helicopters, tiltrotors, and rotorcrafts. Download reducing winglets 50 may be utilized in any aircraft that has wings located below a vertical rotor. Vertical rotor is used herein to denote rotors or fans (e.g., ducted fans) that are positioned, temporarily or permanently, above a wing.

With additional reference to FIGS. 2-8, wings 14 have an inboard end 26, outboard end 20, leading edge 28, and trailing or aft edge 30. Anhedral winglet 50 extends from an inboard end 52, located at wing outboard end 20, through an angular transition 54 to the tip 56. Anhedral winglet 50 has an external surface 58 contiguous with top surface 24 of wing 14 and extending from inboard end 52 to tip 56.

When the aircraft is hovering the pitch of the vertical rotor directs rotor downwash 22 vertically against top surface 24 of wings 14 producing a greater download than when the aircraft is in forward flight. Wing 14 and anhedral winglet 50 are configured to reduce the download produced by the rotor downwash when the aircraft is hovering.

Figure 2:
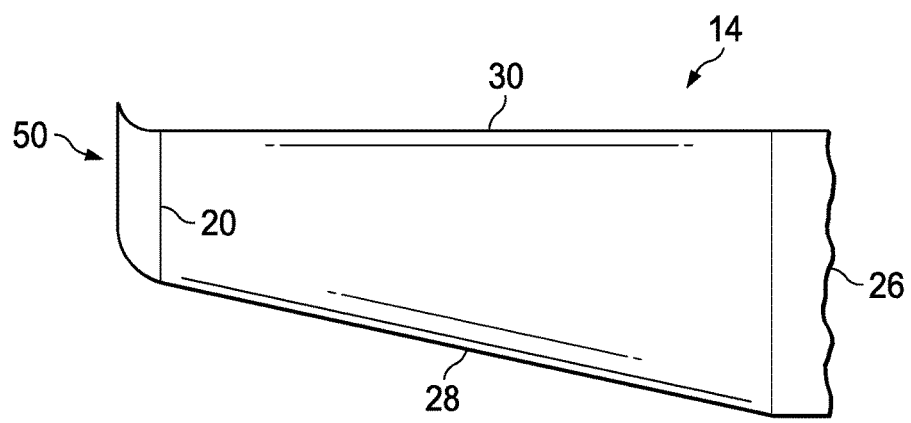
FIG. 2 is a top view of an exemplary wing with a download reducing winglet.
Figure 3:
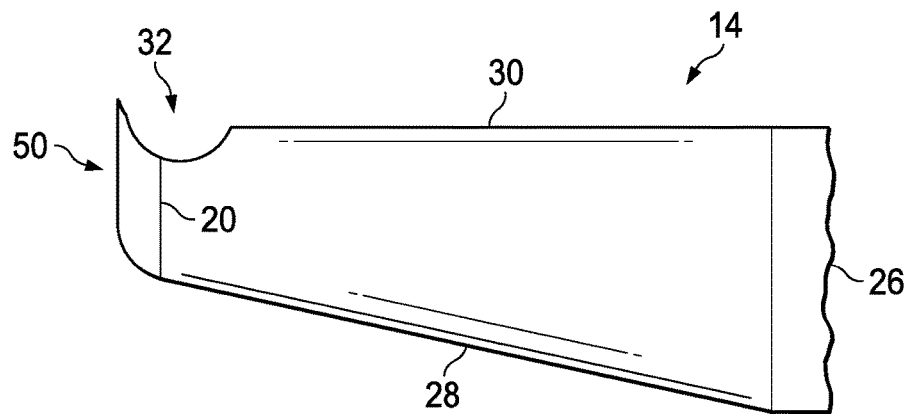
FIG. 3 is a top view of an exemplary wing with a download reducing winglet and a cutout.

FIGS. 2 and 3 illustrate exemplary wings 14. In FIG. 2, trailing edge 30 extends generally linearly from inboard end 26 to outboard end 20. In FIG. 3, trailing edge 30 includes a cutout 32 in the wing. Cutout 32 extends from trailing edge 30 toward leading edge 28 forming a scallop shaped trailing edge 30. In an exemplary embodiment, cutout 32 is located in trailing edge 30 proximate to outboard end 20. Cutout 32 may extend along the trailing edge of anhedral winglet 50.

Figure 4:
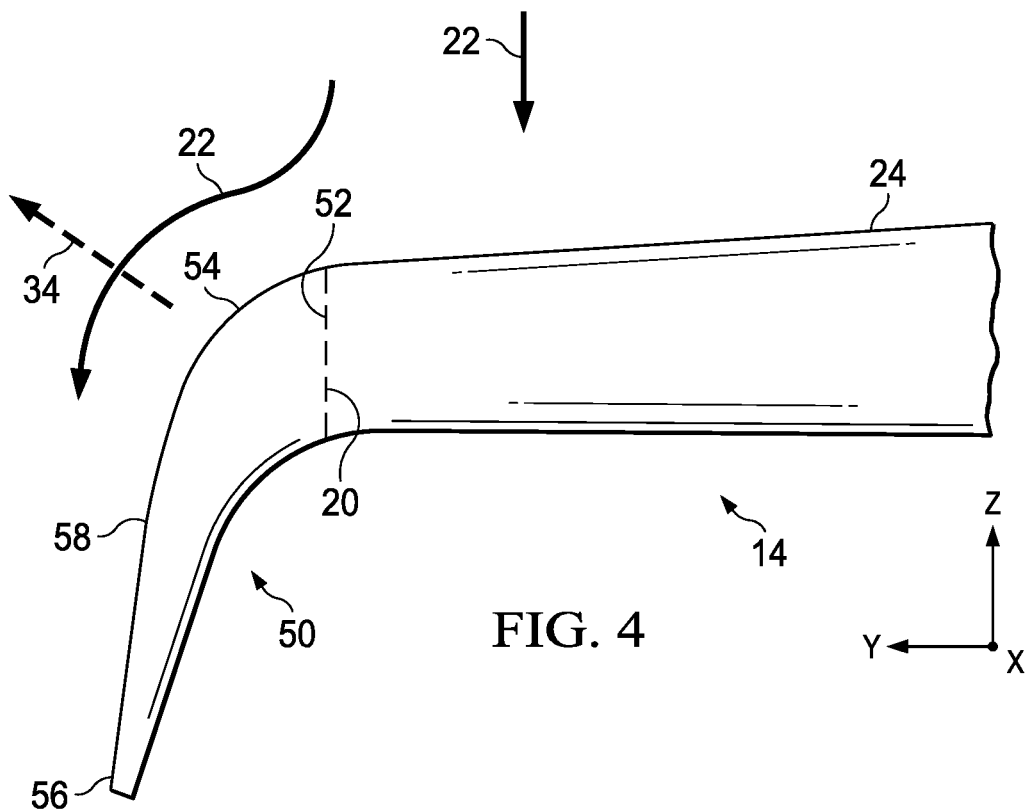
FIG. 4 illustrates rotor downwash passing over an exemplary download reducing winglet.
Figure 5:
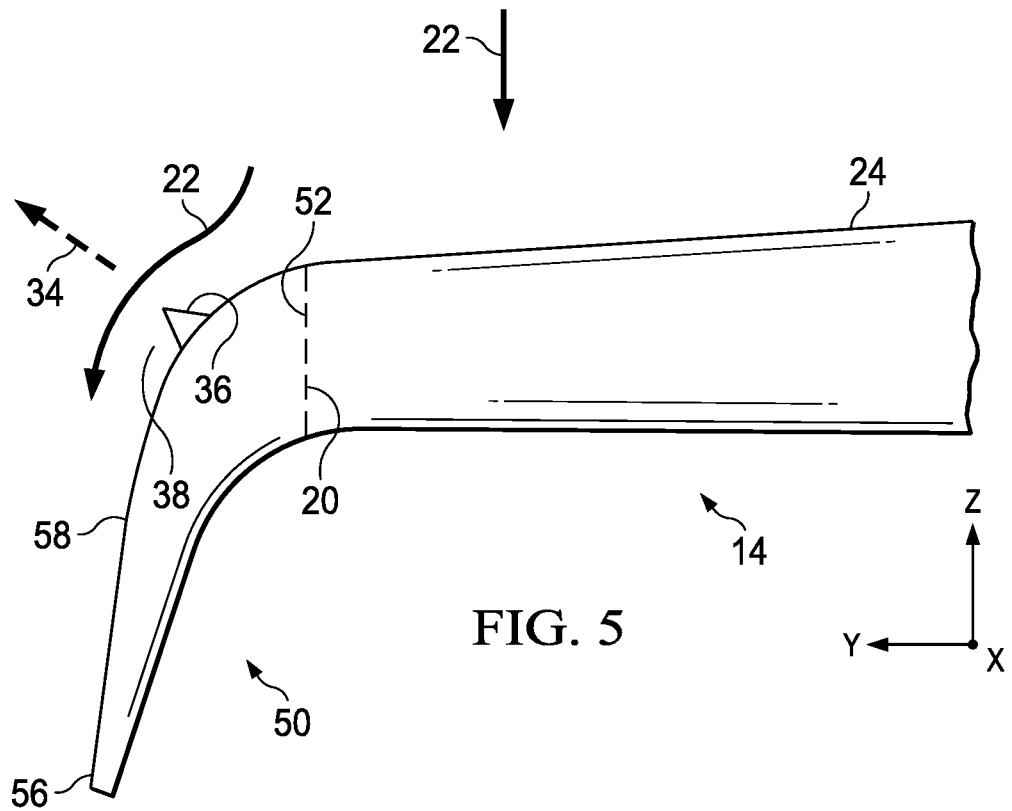
FIG. 5 illustrates rotor downwash passing over an exemplary download reducing winglet incorporating a turbulence feature.

With reference to FIG. 4, rotor downwash 22 impacts top surface 24 of wing 14 and flows outboard and over external surface 58 of anhedral winglet 50. The flow of rotor downwash in the vertical direction across angular transition 54 to tip 56 may create a low pressure zone producing wingtip lift 34 countering a portion of the download. As will be understood by those skilled in the art with benefit of this disclosure, the cant and twist of anhedral winglet 50 and the contour of external surface 58 may be varied to achieve optimal wingtip lift in response to rotor downwash 22. Anhedral winglet 50 may produce some efficiencies with regard to forward flight as well.

With reference in particular to FIGS. 5-8, an exemplary anhedral winglet 50 includes a turbulence feature, generally denoted by the numeral 36, located on external surface 58. A boundary layer 38 is formed along external surface 58 as rotor downwash 22 flows vertically downward across external surface 58. The surface area of the top surface of wing 14 presents a blunt or spherical profile to the flow of rotor downwash 22, which may result in a premature separation of the flow from external surface 58 increasing the downward pressure drag on anhedral winglet 50. Turbulence feature 36 is provided to trigger or induce turbulence in boundary layer 38 and reduce the pressure drag on anhedral winglet 50 and reduce rotor downwash produced download.

Turbulence feature 36 may take various forms including without limitation, surface roughness, trip strips and vortex generators. Turbulence feature 36 may be positioned at various locations on external surface 58. In an exemplary embodiment, turbulence feature 36 is located at angular transition 54. In an exemplary embodiment, turbulence feature 36 is located on external surface 58 at a position that may be identified as, or proximate to, the maximum thickness of wing 14 extending along the span.

Figure 6:
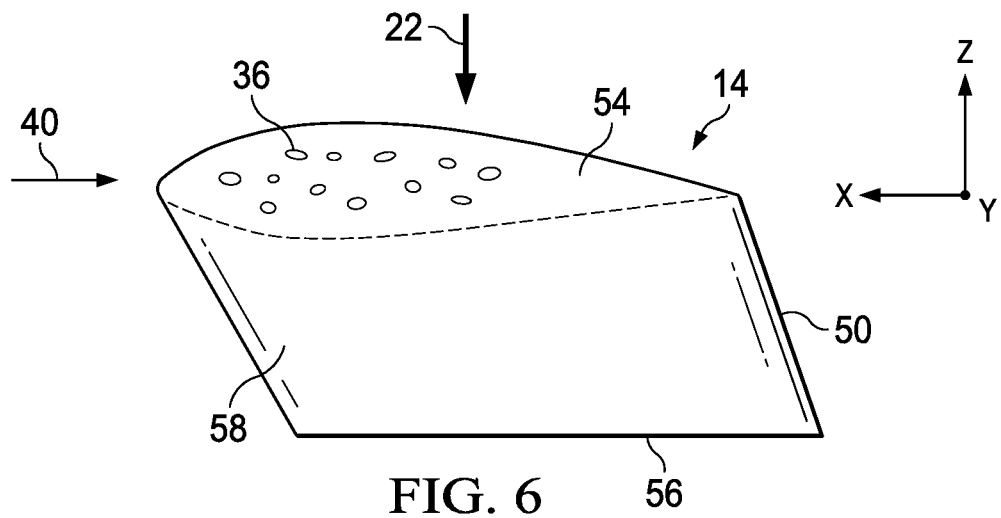
FIG. 6 is a side view of an exemplary download reducing winglet with a turbulence feature.

FIG. 6 schematically illustrates a turbulence feature 36 in the form of surface roughness. The surface roughness of external surface 58 may be increased in various manners. Examples of surface roughness features include dimples or divots, and a rough texture. Surface roughness may provide the benefit of tripping the boundary layer in rotor downwash 22 and also produce efficiencies when the aircraft is in forward flight as indicated by the forward streamline 40.

Figure 7:
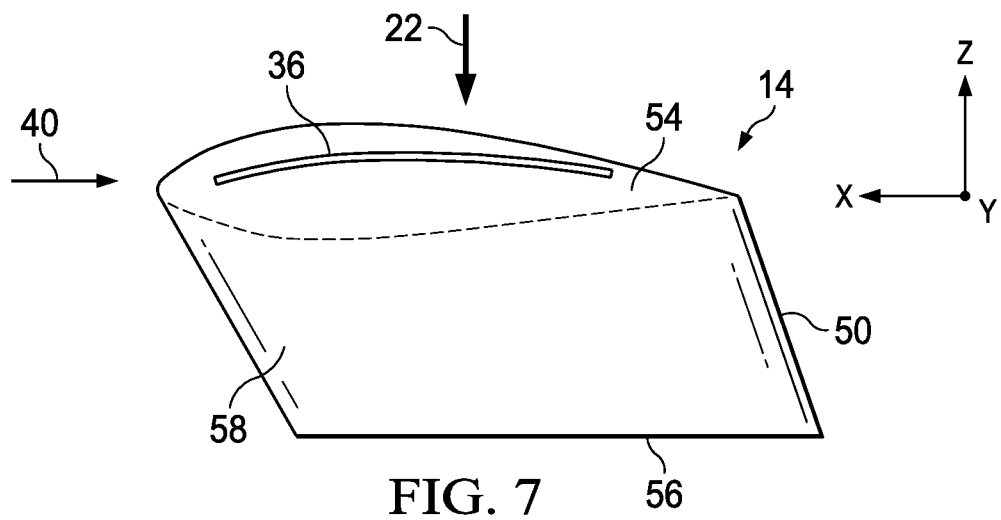
FIG. 7 is a side view of another exemplary download reducing winglet with a turbulence feature.

FIG. 7 schematically illustrates a turbulence feature 36 in the form of a trip strip. In this example, a single trip strip is used, however, more than one trip strip may be used. Trip strip 36 may take different forms and is generally a structure, for example a ridge or wall, having a height to extend into the boundary layer.

Trip strip 36 in this example is located on angular transition 54 of external surface 58. Trip strip 36 extends generally in the longitudinal (axis X) direction and generally perpendicular to rotor downwash 22 when hovering. Trip strip 36 may be oriented to extend parallel, or generally parallel, to the forward cruise streamline 40 when the aircraft is at the maximum cruise speed and attitude. In other words, trip strip may be oriented generally parallel to the chord of wing 14. The orientation of trip strip 36 may be determined to produce the desired benefits during hover and minimize any ill effects in forward flight.

Figure 8:
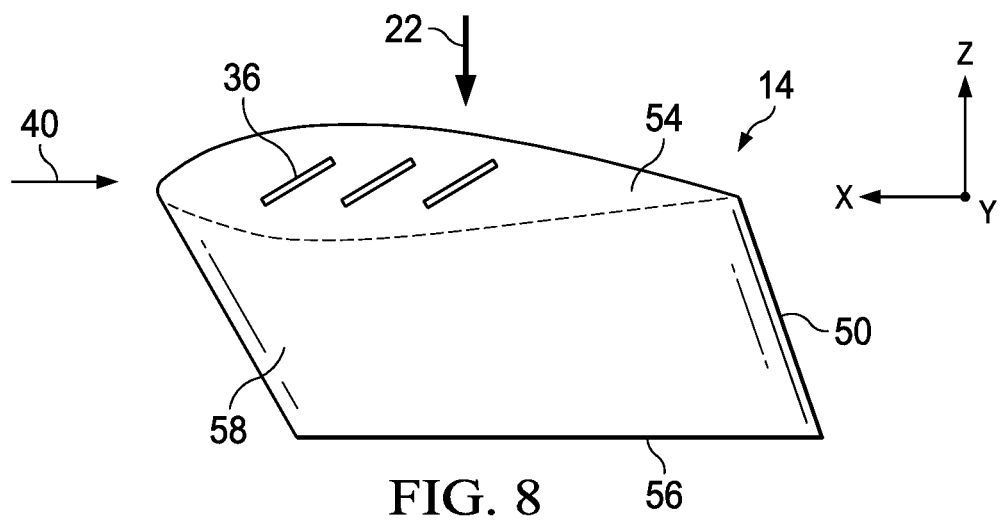
FIG. 8 is a side view of another exemplary download reducing winglet with a turbulence feature.

FIG. 8 illustrates another example of a turbulence feature 36 in the form of a vortex generator. Vortex generator 36 may include for example one or more raised structures oriented obliquely to rotor downwash 22 to create a vortex in the rotor downwash boundary layer downstream of the vortex generator. The vortex generator may be oriented to have limited effect during forward flight or to act as a turbulence feature in the forward flight streamline 40.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft comprising:
a rotor rotating about a rotational plane and in operation producing a rotor downwash;
a wing positioned below the rotor and extending to an outboard end, a length of the wing being at least half a length of a rotor blade of the rotor; and
an anhedral winglet extending from the outboard end through an angular transition to a tip, the anhedral winglet having an external surface exposed to the rotor downwash;
wherein the external surface is contoured to generate local wing lift in response to the rotor downwash;
wherein the anhedral winglet is positioned within a projection of an area defined by the rotor in operation onto a plane parallel to the rotational plane.

2. The aircraft of claim 1, further comprising a turbulence feature located on the external surface and oriented to induce turbulence in the rotor downwash passing across the external surface.

3. The aircraft of claim 2, wherein the turbulence feature is located on the angular transition.

4. The aircraft of claim 2, wherein the turbulence feature is a surface roughness feature.

5. The aircraft of claim 4, wherein the surface roughness feature comprises a plurality of dimples.

6. The aircraft of claim 2, wherein the turbulence feature is a vortex generator.

7. The aircraft of claim 2, wherein the turbulence feature comprises a ridge extending generally longitudinally.

8. The aircraft of claim 7, wherein the ridge is located on the angular transition.

9. The aircraft of claim 2, wherein the turbulence feature is a ridge oriented generally parallel to a forward flight airstream at a cruise speed.

10. The aircraft of claim 2, wherein the turbulence feature is a ridge oriented obliquely to the rotor downwash.

11. The aircraft of claim 1, wherein the wing comprises a cutout of an aft portion of the wing proximate to the outboard end.

12. The aircraft of claim 11, further comprising a turbulence feature located on the external surface.

13. The aircraft of claim 12, wherein the turbulence feature is at least one of a surface roughness feature and a ridge oriented generally parallel to a forward flight airstream at a cruise speed.

14. The aircraft of claim 12, wherein the aircraft operates in a hover.

15. The aircraft of claim 12, wherein the turbulence feature is a ridge oriented obliquely to the rotor downwash.

16. A method comprising:
operating an aircraft in a hover, the aircraft having a rotor rotating about a rotational plane and producing a rotor downwash directed downward onto a wing extending to an outboard end and an anhedral winglet extending from the outboard end through an angular transition to a tip, the anhedral winglet having an external surface exposed to the rotor downwash, a length of the wing being at least half a length of a rotor blade of the rotor; and
wherein the anhedral winglet is positioned within a projection of an area defined by the rotor in operation onto a plane parallel to the rotational plane.

17. The method of claim 16, comprising the anhedral winglet generating local lift in response to the rotor downwash.

18. The method of claim 16, further comprising triggering turbulence in the rotor downwash on the external surface of the anhedral winglet in response to a turbulence feature located on the external surface.

19. The method of claim 16, wherein the wing comprises a cutout of an aft portion of the wing proximate to the outboard end.

20. The method of claim 19, further comprising triggering turbulence in the rotor downwash on the external surface of the anhedral winglet in response to a turbulence feature located on the external surface.

* * * * *